(12) United States Patent
Popov et al.

(10) Patent No.: US 9,202,177 B2
(45) Date of Patent: Dec. 1, 2015

(54) ADAPTIVE COGNITIVE METHOD

(76) Inventors: Ivaylo Popov, Sofia (BG); Krasimir Popov, Sofia (BG)

( * ) Notice: Subject to any disclaimer, the term of this patent is extended or adjusted under 35 U.S.C. 154(b) by 302 days.

(21) Appl. No.: 14/006,983

(22) PCT Filed: Mar. 27, 2012

(86) PCT No.: PCT/BG2012/000008
§ 371 (c)(1),
(2), (4) Date: Sep. 24, 2013

(87) PCT Pub. No.: WO2012/129616
PCT Pub. Date: Oct. 4, 2012

(65) Prior Publication Data
US 2014/0025612 A1    Jan. 23, 2014

(30) Foreign Application Priority Data
Mar. 28, 2011   (BG) ........................................ 110895

(51) Int. Cl.
G06F 15/18    (2006.01)
G06N 99/00    (2010.01)
G05B 19/042    (2006.01)

(52) U.S. Cl.
CPC .......... *G06N 99/005* (2013.01); *G05B 19/0426* (2013.01)

(58) Field of Classification Search
None
See application file for complete search history.

(56) References Cited

U.S. PATENT DOCUMENTS

| | | | | |
|---|---|---|---|---|
| 2010/0131080 A1* | 5/2010 | Brown | ................. | G05B 19/042 700/17 |
| 2014/0025612 A1* | 1/2014 | Popov | ................. | G05B 19/0426 706/14 |
| 2014/0164116 A1* | 6/2014 | Popov | ............... | G06F 17/30699 705/14.54 |

FOREIGN PATENT DOCUMENTS

RU      2193797 C2    11/2002

OTHER PUBLICATIONS

International Search Report, Jun. 18, 2012, from International Phase of the instant application.

* cited by examiner

*Primary Examiner* — Jeffrey A Gaffin
*Assistant Examiner* — Paulinho E Smith
(74) *Attorney, Agent, or Firm* — Jackson Patent Law Office

(57) ABSTRACT

An adaptive cognitive method has been revealed where each distinguishable information unit, entering a given input channel, receives a unique label /identifier/ which serves as a center for the dynamic building of a structure for the presentation of knowledge on the respective information unit. A basic marker for the analysis of the correlation between the separate information units is the time quantum which is recorded—for each change—in the data base. The time quantum is the number of the shortest periods of time for the system, which have so far passed.

18 Claims, 6 Drawing Sheets

Fig 3. Table information units

Figure 1:
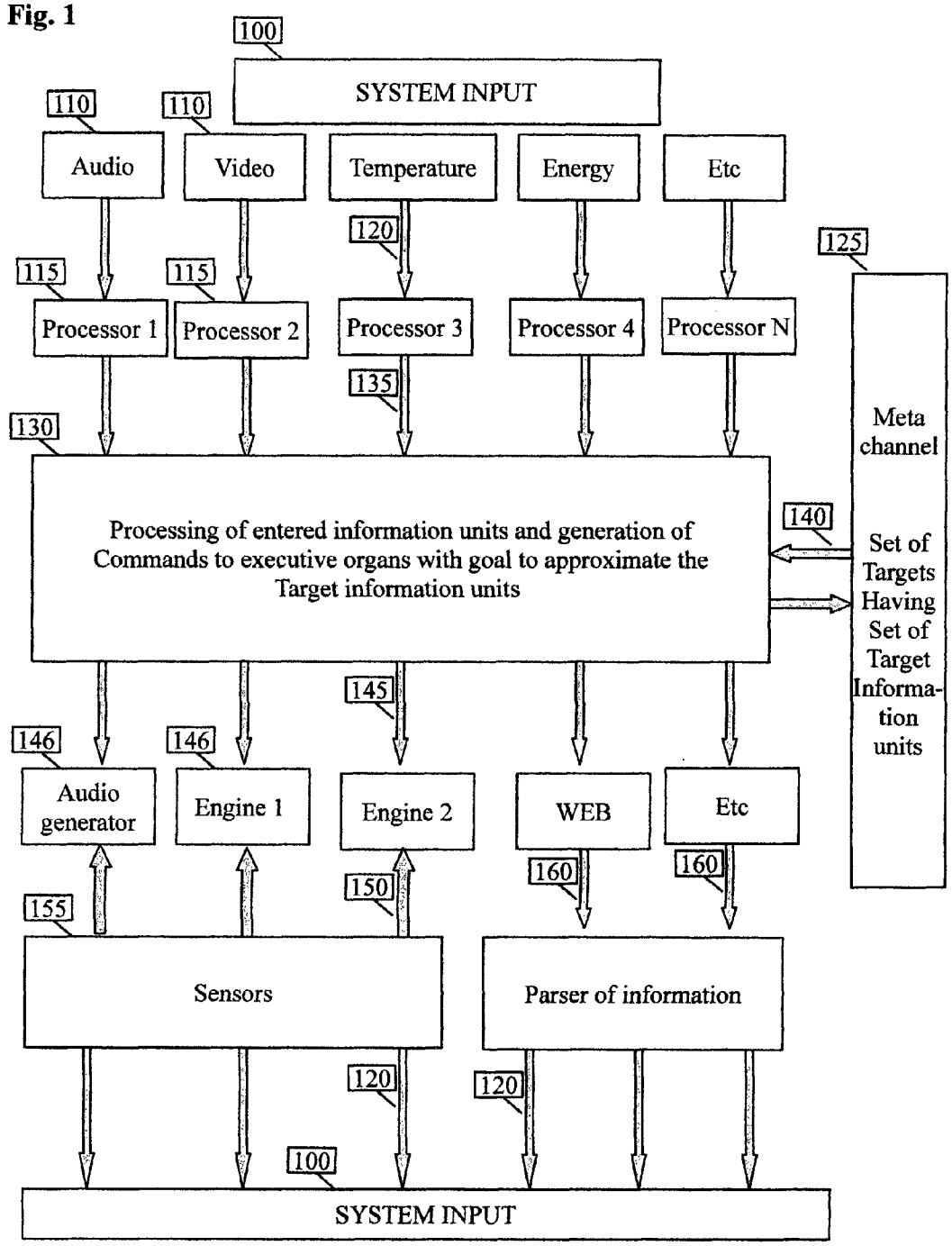

| Guid | Channel type | Channel ID | Stastus | Use count | Characteristics count | Time quantum |
|---|---|---|---|---|---|---|
| {1F37D9A1-F2CC-42B6-8F7A-5200AC894922} | input | 3 | active | 65 | 3 | 2160807 |
| {B441F58D-D8DB-4ACE-938F-117715861684} | command | 5 | active | 28 | 1 | 2185933 |
| {EF6B664E-3CC2-4988-B322-4EA187D768E4} | meta | 8 | active | 5 | 7 | 2199402 |
| {DF85C02A-5715-4FCD-A59B-44B-CF567355F} | memory | 9 | active | 120 | 20 | 2217949 |

Fig 4.  Table information units details
| No | Unit ID | Characteristic ID | Time quantum |
|---|---|---|---|
| 1 | {1F37D9A1-F2CC-42B6-8F7A-5200AC894922} | color | 2867593 |
| 2 | {1F37D9A1-F2CC-42B6-8F7A-5200AC894922} | size | 2881172 |
| 3 | {1F37D9A1-F2CC-42B6-8F7A-5200AC894922} | form | 2895082 |
| 4 | {1F37D9A1-F2CC-42B6-8F7A-5200AC894922} | value | 2908552 |
| 5 | {B441F58D-D8DB-4ACE-938F-117715861684} | move | 3004567 |
Fig. 5  Table characteristics values
| No | Value | Time quantum |
|---|---|---|
| 1 | red | 3482477 |
| 1 | green | 3530196 |
| 2 | 50 | 3459774 |
| 2 | 65 | 3499552 |
| 100 | {20849413-202F-4031-916C-C88112B1DA92} | 368875 |
| 3 | rounded | 3491056 |
| 4 | #pointer to BLOB object | 3491345 |
Fig. 6  Comparison of information units
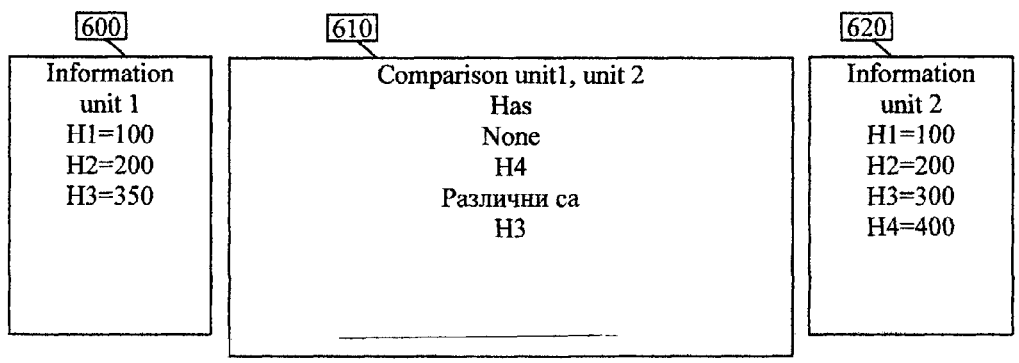

Fig. 7 Correlation input - target
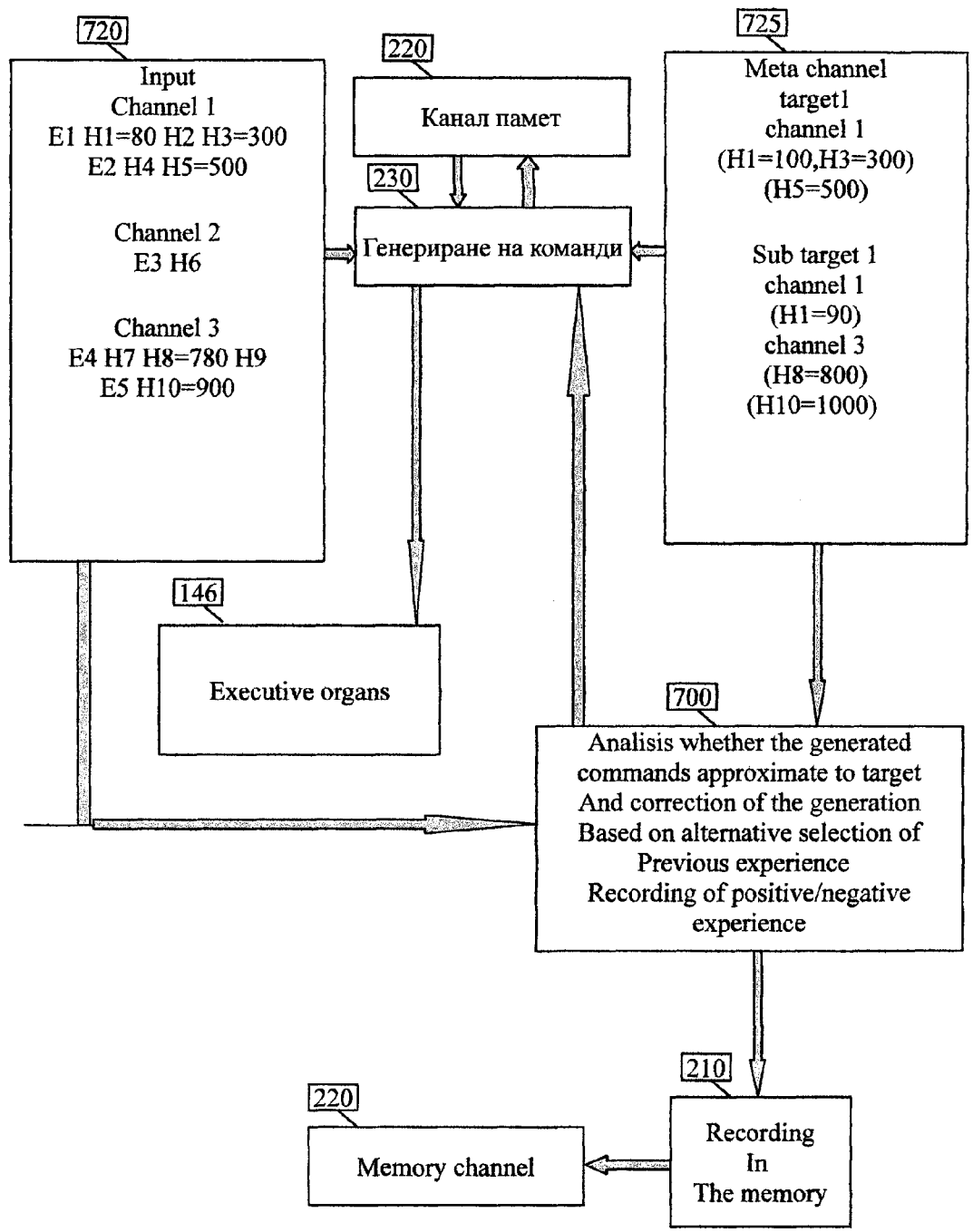

Fig. 8 Associations

Table information units details

| No | Unit ID | Characteristic ID | Time quantum |
|---|---|---|---|
| 1 | {1F37D9A1-F2CC-42B6-8F7A-5200AC894922} | color | 2867593 |
| 2 | {1F37D9A1-F2CC-42B6-8F7A-5200AC894922} | size | 2881172 |
| 3 | {1F37D9A1-F2CC-42B6-8F7A-5200AC894922} | form | 2895082 |
| 4 | {1F37D9A1-F2CC-42B6-8F7A-5200AC894922} | value | 2908552 |
| 5 | {B441F58D-D8DB-4ACE-938F-117715861684} | move | 3004567 |
| 6 | {63B5E73B-30D7-4D16-93A0-35D01EABCB64} | {B2D71F8A-D970-496C-B166-9A7BFF5B9652} | 3859479 |
| 7 | {63B5E73B-30D7-4D16-93A0-35D01EABCB64} | {E5A7A7BB-9FC6-4566-AA0E-686D08CB28AD} | 0 |
| 8 | {76E8280C-6976-4071-A108-E88848BAA1C6} | Association1 | 4165479 |

Table characteristics values

| No | Value | Time quantum |
|---|---|---|
| 1 | red | 3482477 |
| 1 | green | 3530196 |
| 2 | 50 | 3459774 |
| 2 | 65 | 3499552 |
| 100 | {20849413-202F-4031-916C-C88112B1DA92} | 368875 |
| 3 | rounded | 3491056 |
| 4 | #pointer to BLOB object | 3491345 |
| 6 | Is not necessary | 3859530 |
| 7 | Always appears simultaneously | 4047980 |
| 8 | {26503DB8-D6DB-43D7-9E38-022A8E5B06CF} | 4167453 |

ADAPTIVE COGNITIVE METHOD

TECHNICAL FIELD

Artificial intellect systems, robots, expert systems, self-educating systems.

BACKGROUND ART

The artificial intellect systems, on the level of contemporary technology, include knowledge bases. A number of methods are known for the transfer of knowledge as a system of rules, semantic networks, neuron networks, knowledge representation by frames. All of these systems are based on the presumption, that at least part of the contents of their knowledge bases have been submitted and registered by people, experts in their field. It is even subtly supposed that new rules may be added to the knowledge base singularly by man. This makes the behavior of the expert system predictable in the case of an examined set of input data but it also makes the system restricted to the sphere of rules which it already contains. Self-education, which is also a frequently met practice, does not alter the rules of the expert system set in advance but rather fills in a bulk of statistical data which is processed on the basis of a method set in advance and is calculated also as per a set method of possible reaction. Such systems are efficient within restricted spheres, where for the eventualities for a finite number and for every possibility a preliminary expert answer may be produced. On the other hand, the artificial intellect is characteristic with the capacity to adapt to the environment and according to some philosophic definitions, the intellect is the ability of the individual to adapt the environment to his own self. The proposed method offers a machine realization of basic principles via which the system can adapt itself to the environment or—upon reaching a certain level of complexity—it can adapt the environment to itself.

DESCRIPTION

Short Description of the Figures

FIG. 1. Plan of the system, functioning according to the method

100—Input to the system of various streams of sensor information

110—Various streams of sensor information: audio, video, temperature-related data, pressure

115—Hardware or software processors interpreting specific sensor derived information and transforming that to information units with their characteristics.

120—Input channels for specific sensor information, transferring the signals from the sensors.

125—Meta-control channel where the information units are registered—targets, each of which has numerous target units for the input channels.

130—Processor for the logical processing of the input information units and the generation of commands to the executive organs as well as the registration of tasks in the meta-control channel.

135—Input channels transmitting information units representing the input sensor information.

140—Input-Output of the processor for logical processing to meta-control channel

145—Command channels for the executive organs of the system.

146—Executive organs of the system.

150—Sensor information channels.

160—Information channels.

Figure 2:
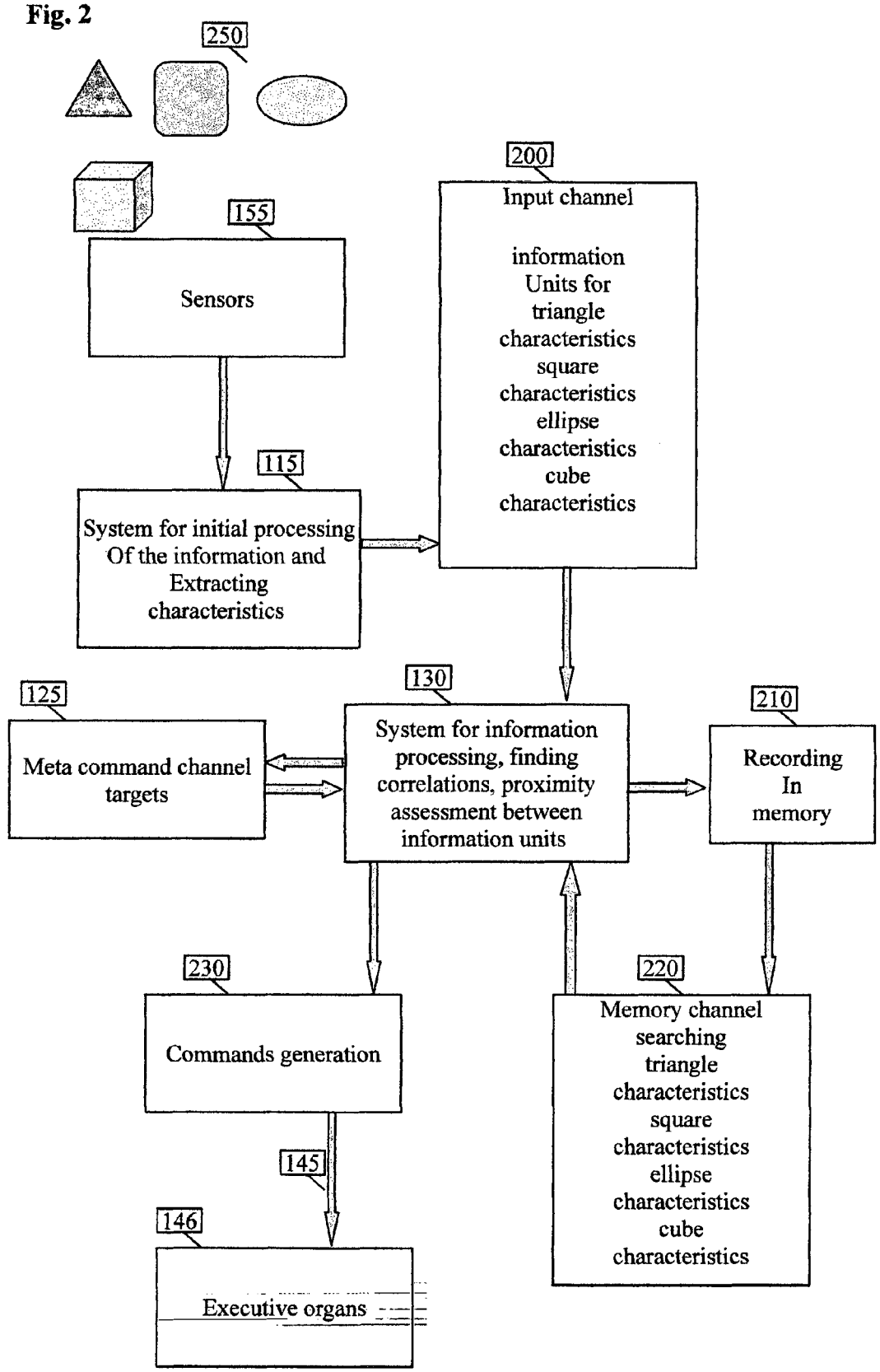

FIG. 2. Plan of the interconnection between the various information channels in the system.

200—Input channel, containing information units formed after the initial processing of the sensor information.

210—Entering into the memory of the entire information unit or recording only the values of the characteristics in the similar information unit, found in the memory.

220—Memory channel, containing information units from the past. In this channel information units will be searched which conform to the units at the input.

230—Generation of commands to the executive organs of the system so that the information units at the input may come as close as possible to the information units in the meta-command channel.

250—Objects from the real world.

FIG. 3. Information units table

FIG. 4. Table of information unit details

FIG. 5. Table of the values of the characteristics

FIG. 6. Comparison of the information units

600—Information unit 1 with characteristics H1, H2, H3

610—Information unit for the purpose of comparison

620—Information unit 2 with characteristics H1, H2, H3, H4

FIG. 7. Correlation input—target

700—Analysis of whether the generated commands approximate the target and correction of the generation based on an alternative selection of a previous experience. Recording in the memory of a positive/negative experience.

710—Input channel for details.

720—Meta command channel for details. The obligatory characteristics for a unit of target as an initial, end time quantum, maximum difference between the initial and end time quantum, results from the execution have not been shown as these characteristics are auxiliary and do not exert an influence on the assessment for the proximity of one information unit to another.

FIG. 8. Associations

A "Table of information units and details" has been shown as well as a "Table of values of the characteristics" and in lines 6 and 7 of the two tables shows the connections of the information unit {63B5E73B-30D7-4D16-93A0-35D01EABCB64} with other information units has been illustrated plus the possible values of these connections in the "Table of values of the characteristics". Line 8 of the two tables shows an exemplary association of the information unit {76E8280C-6976-4071-A108-E88848BAA1C6} with information unit {26503DB8-D6DB-43D7-9E38-022A8E5B06CF} according the criterion Association 1.

Let the system have an "N" number of input channels (110). Among these input channels there may be an audio channel, a visual channel, text data channel, channels for other sensor-derived data such as temperature, pressure, touch. Of major importance are the channels with emergency information on the devices, building the system and they have the highest priority in processing and decision making. Let each channel generate a data stream and let a specialized processor (115)/hardware or software) be connected to each data stream for dividing it (110) into the smallest, distinguishable information units for the respective channel. For example, for the text channel, the smallest such units are the words, for the audio channel this is a distinguishable sound and for the video channel—the single color spots. After the primary processing (115) a number of data, identified by the system, will be produced for the various information units (135). The color spot has a color, size, form; the word has length, number of consonants and vowels, it also has meaning; sounds have pitch, frequency and tone. The system will give a unique label /identifier/ (FIG. 3 Quid) to each distinguishable information unit. The label /identifier/ of the information unit (FIG. 3 Guid) serves as an address for attaching the derived characteristics (FIG. 4 Characteristic ID) of the information unit as well as the input value of the channel which has generated it. The value of the information unit is its mandatory characteristic (FIG. 4 Characteristic ID=value). Part of the characteristics of the information unit are its connections to other information units (FIG. 5 No=100). The characteristics of the information unit are used as criteria for searching in the data base of the system (220) for finding similar, memorized information units. The similar information units obligatorily have a list of subsequent information units which have appeared after them in the input stream (135). Of all registered possible subsequent information units, after a given unit a list may be formed containing characteristics for filtering at the input stream until gain to the expected information unit. It is possible, that a priority signal in the input stream may break the normal process and to initiate a new cognitive chain.

In addition to the input channels (135), the system has "K" command channels (145). Along these channels (145), a data stream will be transferred to the executive organs (146) of the system. The smallest distinguishable units in the data stream of the command channel are the commands. Let the data stream in the command channel (145) be subjected to analysis in a way similar to analyzing a data stream from an input channel (135). As mentioned above, each command will receive a unique label and its possible parameters are attached to it as characteristics of an information unit; a list of possible subsequent commands is also created.

In its initial state, let the system have a small number of predefined set of correspondences between the information units fed at the input channels (135) and a group of commands to the executive organs (146) of the system. In its initial stage, let the system respond to the non-defined information units, entering the input channels (135) with a random set of commands, dispatched along the command channels (145).

The system under description has incoming information units (135) and output commands (145), interpreted and brought down again to information units. The cognitive process must find the correlation between the information units, so that the generated commands (145) conform to a maximum degree to the input information units (135). The optimal conformity is defined by a meta command channel (125, 725), the data stream of which includes information units interpreted as targets. The information units which are targets are normal information units (725), which possesses mandatory characteristics starting time quantum, end time quantum, numerous information units (725), which appearance the system should try to enable in its input channels, end result. The closer the input stream of information units (135) from the observed input channels (120) to the set of information units in the information unit-target in the meta command channel (125, 725) the better the assessment will be for the optimality of the command stream. The assessment of the optimality of the command stream is a dynamic characteristic of the information unit-target (725). The process of generating commands for the command channels (145) in order to achieve an input stream of certain information structures (135) passes through a search in the data base (220) of a registration of the information units from the target set by looking for the greatest time proximity between them (FIG. 3, 4, 5 time quantum). It should be borne in mind that if the information unit is not registered by the system (220), it cannot appear in the target set of information units (725). This permits the searching in the base (220) for the registration of the information unit or its previous encounter. A sequence of commands is being searched for (145→220), which is associated with the appearance of the information unit. If no sequence of commands is found (145→220)—that is, the target is not routine—connections of cause and effect must be found between the information unit and the appearance within the time proximity (FIG. 3, 4, 5 time quantum) of other information units close by. When finding mandatory information units, for the appearance of the searched information unit new information units-targets will be created and sent to the meta command channel (725). To the set of anticipated information units of the major target, information units will be added which represent the successful completion of the sub-tasks. The method is that of trial and error. There is a possible assumption that the appearance of a given information unit is mandatory for the appearance of another information unit which does not cause approximation to the target, although this is also a trial—the fact is being registered, that the two information units appear independently of one another. This deduction may be formed as a new information unit or as a new characteristic of the target information unit. All sub-tasks in the meta command channel (125, 725), all commands, generated for the command channels (145) are marked with the identification number of the information target unit from which they originate. As the sub-target of a given task at a given point in time is also a major task, one and the same information unit or command may have a number of markings, defining its associations (FIG. 8), Due to the fact that the initial conditions differ when placing one and the same task a number of times, the system generates varying sequences of commands (145) for the achievement of one and the same task (725). All executions are associated with the set task, but they are also associated with a given time interval as described below and analysis can be performed on which sub-targets are present in all executions and also to try, during the next target identification, to reach it only by truly mandatory sub-targets. Thus the process of achieving a given task is being optimized.

In order to be able to define the correlation between the various input (135) and command channels (145), a simple and easily distinguishable characteristic should set the place of a given information unit in relation to the others. The natural characteristic via which the correlation between the various information units may be analyzed is time (FIG. 3, 4, 5 time quantum). As the artificial intellect system is, in principle, a dynamic system, via the time factor its various states may be distinguished. The smallest time period, which the system can distinguish, defines its maximal sensitivity. The changes, occurring in the system within the said shortest time period, are not analyzed in separate but are taken as an end result. This end result may be the average value of the change. In technology, this process is termed the "sampling" of a signal. Let us accept, that from the initial starting of the system an X quantums of time have elapsed then each change in the base of the system at this time point is marked with the digit X. A change in the system may be the registering of an information unit, the addition of a new characteristic of the information unit or the addition of a new value for a given characteristic. Which information unit is before and which after, which information units appear simultaneously and even the proximity between two information units in the input stream may be found via the filtration of the size of difference between the quantum characteristics (time quantum) of the information units. Through the filtration of a varying difference between the time quantum of the separate information units one may perform analysis in the different time intervals and to derive correlations between the separate information units. In this way one may search for a cause and effect connection by filtering chains of time consecutive information units which end with a given information unit. A set of simultaneously appearing information units may be identified as units, defining a new compound information unit which, in its turn, has a time quantum and characteristics.

Another indispensable characteristic for the optimization of the system is the usefulness of the information unit—this may be a counter for the times an information unit (FIG. 3 Use count) was used in the cognitive process. Each comparison with the information unit (610) is a form of use and in each new case of comparison the counter increases by one. Each change in the information unit is also a kind of usage, making the counter increase by one. The usefulness of a given information unit is directly proportional to the usage counter and inversely proportional to the difference between the current time quantum and the maximum time quantum of the information unit. A functional dependence may be derived between the two characteristics, which leads to the calculation of the possibility of deleting the information unit from the system (220). On the other hand, the usage counter (FIG. 3 Use count) may be used when sorting the candidates for similar information units just like the difference between the current time quantum and the maximum time quantum of the information unit.

The system under description has the feature of being very fast in registering a multitude of information units (220), which will create memory-related problems and problems with the functional efficiency. This is why a type of compression must be used. The characteristics of the information unit (FIG. 4, Characteristic ID) is employed as a criteria for searching the data base of the system and for finding similar, memorized information units (220). The information units found may have absolutely the same characteristics as the new information unit; they may have more or fewer characteristics; similar characteristics may have contradicting values (FIG. 6). When a similar information unit has been found in the base (220) having the same characteristics, to the list of values of the respective characteristics of the old information unit the values and the time quantum of the new information unit will be added (FIG. 5) and the new information unit will be deleted. When the characteristics of the registered information unit do not exactly conform to the characteristics of the new information unit, the new information unit will be registered in the data base together with the new doubts relating to the comparison, formed as an information unit (610). The information unit (610) for comparison includes—as characteristics—the compared information units and a list of discrepancies found during the comparison process. Upon the appearance of numerous information units (610), generated from doubts during the comparison, the problem is solved via the formation of a new information unit the characteristics of which are only the similar (invariant) characteristics of the examined set of information units. The invariant characteristics of the information units belonging to the examined set will be deleted and in its place as characteristic just created information unit having only the invariant characteristics of the examined set is added. The information units for comparison, connected to the process, will be deleted while the transformed information units will be sent to the input channel (135) for a new analysis.

If, during the comparison, one and the same information unit for analysis (610) is reached many times it will be presumed that there is a connection between the compared information units (600, 620). The information unit for comparison (610) is eliminated and numerous appearances of information units with slight differences are resolved by the summary of all information units down to one information unit, where for the different values of a given characteristic a list is made and each value is marked with the time quantum when its is encountered (FIG. 5).

The volume of input data (135) is so large that compression alone is not a satisfactory solution. A mechanism must be in addition for deleting the unnecessary information units. One simple way is to delete the information units, the latest registered time quantum of which has more than a set difference with the current time quantum. However, because there is a possibility for the existence of numerous connections of the deleted information unit with other information units which may cause problems with the data base (220), the deletion may relate only to the accumulated information to the information unit (FIG. 4, 5 No. 4), by keeping empty the information unit with the same label, characteristic (FIG. 3 Status) passive and marking of the time quantum. In this way space is being obtained but the structure of the connections remains intact.

Practical Examples

A system, similar to the one described (FIG. 1), may be realized in a number of ways, of which any specialist in this sphere is well aware of. The task may be achieved via object programming and in particular via connected to a data base objects, named by programmers "entities". Without restricting the possible methods for realization, as an example for the easy understanding of the subject matter, a realization of the system is presented via a system for controlling a relational data base and a system of rules generating queries to the data base.

As a minimum, the data base must contain the following tables:

Information Units Table (FIG. 3)

Unique identifier /a good example is the use of GUID—global unique identifier/ (GUID).

Channel type (input channel, command channel, meta command channel, memory channel) (Channel type)

Channel identifier /identifier of a channel in which data stream the information unit has been encountered/ (Channel ID).

Status /Active, Passive/ (Status)

Usage counter /number of uses of the information unit in the cognitive process/. (Use count)

Characteristics counter /Number of characteristics of the information unit/. (Characteristics count)

Time quantum of the status change. (time quantum)

Information Units Details Table (FIG. 4)

Unique connection number. (No)

Unique identifier of the information unit (Unit ID).

Unique characteristics identifier /the characteristic is also a registered information unit. For each information unit the mandatory characteristic is the value characteristic/ (Characteristic ID).

Time quantum for establishing the connection.(Time quantum)

Characteristics Value Table (FIG. 5)

Unique connection number. (No)

Value /when the information unit, used as a characteristic, does not have a characteristic—this is its value when the information unit used as a characteristic, on its part, has a number of characteristics this is the unique number of the information unit/. (Value)

Time quantum of the change.(Time quantum)

Work Method

The information unit is registered in the base with a record in the Information units table (FIG. 3), the active status (Status) is also recorded and the current time quantum (time quantum). The information unit may be deleted physically if the exact correlation in the data base is found (220). The physical deletion means the deletion of all entries in the base, which are directly or indirectly connected to the information unit and the deletion of the record for the information unit in the Information units table (FIG. 3). The information unit may be deleted logically by changing the time quantum and the status to passive in the respective record in the Information units table (FIG. 3) the value field may be cleared (FIG. 4, 5 No. 4) of the information unit as well as to delete the list of values of its characteristics. The remaining entries in the base, relating to the information unit, give by not destroying already established connections between the information units a general impression, that something like with generally defined characteristics (FIG. 4, Characteristic ID) was existing to a time quantum . The characteristics themselves (FIG. 4, Characteristics ID) may also be deleted if the their time quantum (time quantum) is sufficiently distanced in time from the current time quantum.

When identifying the information unit at the input of the Information units table (FIG. 4), a query is made to select records which have unique identifier of characteristic (Characteristic ID) which can be found in the list of characteristics of the new information unit and the channel type (Channel type) of the information unit must be the Memory channel. The selection must be grouped as per the unique label of the information unit (Unit ID), to contain the selection of the use counter (Use Count), where the information unit has the unique label (GUID) equal to the unique label of the group (Unit ID), to have counter of the lines of the separate groups and to define the maximum time quantum for each group (max(time quantum)). The selection must be sorted in ascending order as per the difference between the counter for the characteristics of the respective information unit, recorded in its definition, and the counter for the found characteristics of the same information unit upon the grouping of the selection and at the same time, the selection must be sorted in a descending order as per the maximum time quantum for a group and in descending order according to the number of uses. Thus a list of candidates is obtained of information units similar to the input one, which are arranged as per the closest proximity not only by characteristics but also by the time of encounter and frequency of use. In the ordered list of candidates for similar information units, in the same order, the values of the separate characteristics of the input information unit are compared with the information units from the list. Upon finding a sufficiently close correlation in the Table of values of the characteristics (FIG. 5) new values of the characteristics are being added as well as a time quantum to the established similar information unit. In the opposite case, the information units table (FIG. 3) will receive a new record for the information unit in the memory channel; the table in information unit details (FIG. 4) entries will be made for the characteristics First unit, Second unit, None, Has, Different. In the table Characteristics value table (FIG. 5) are recorded the unique labels for information units for characteristics First unit and Second unit. In the same table and in the characteristic "None" such characteristics will be entered, which the First unit does not have but the Second has; in the characteristic Has such characteristics will be entered which the First unit has but the Second doesn't, in the characteristic "Different" the characteristics will be entered which have been found in both First and Second unit but with different values, i.e., the value of the characteristics of First unit cannot be found in the list of values of the Second unit.

When a snapshot must be found, for example by the moment when a given information unit has appeared, a selection is made of such information units from the memory channel which have at least one characteristic with a time quantum, falling within the set interval. Such are all of the information units which have been active by the given point in time.

The sending of a command to the executive organ is the same as a record of an information unit in a command channel (FIG. 3, Channel type=Command) for the respective channel number (Channel ID).

The sending of a meta command is equivalent to a record of an information unit in a meta command channel (FIG. 3 Channel type=Meta).

Receiving input information from sensor channels is equivalent to a record of an information unit in the input channel (FIG. 3, Channel type=Input).

The information inputs from all channels (FIG. 3, Channel type), including the Memory channel (FIG. 3, Channel type=Memory) simplifies the unified processing as well as the examination of the correlation between the information units in the various channels.

Industrial Applicability

The invention may be applied as a system for the artificial intellect of robots, operating with different sensor channels (110) and executive organs (146). It may also be used as a self-educating expert system for the analysis of large volumes of data, like the Internet environment. This presumes, that the channels described above (110), which for the sake of clarity were pictured as independent, in the case of the Internet cannot exist in separate and the input flow is a mix of information which should be interpreted by various channels (115). This resembles the exemplary realization, where data from the various channels with suitable marking are registered in one and the same place. Internet pages have a clear marking pattern, indicating audio files, videos files, pictures or texts. This permits the Internet to be an input channel (110) to the described system. Tasks in the meta channel on the other hand (125, 725) may be of the type "organize a trip for the end of the week". The commands (145) to the executive organs (146) may be directed at a search engine—"find sites containing "trip""—to a natural language interpreter—"interpret the text and find the date for "trip"" and if the date coincides with the end of the week, a command to a network resource for defining the rating—"give me the site's rating", "the rating of the trip". An example for the system may be the manual search performed by the user. The trial and error method could be efficient for the training of the expert system and improving the results when the objectives are achieved.

The invention claimed is:

1. An adaptive cognitive method, characterized with the following steps:
   transforming the sensor-derived information from input streams insets information units, having an unique identifier, value from the input stream caused the generation of the information unit and various characteristics which may be found via the processing of the input sensor information by specialized hardware or software processors;
   recording tasks in a meta command channel in the form of information units with characteristics, comprising of a set of expected information units at the input channels;
   recording commands for the executive organs of the system in a command channel in the form of information units identifying commands and having as characteristics the parameters of these commands;

processing the information units in the separate channels using one and the same method and searching for a correlation between the separate units;

generating commands to the executive organs of the system based on the correlation between the information units in the meta command channel and the information units recorded in the memory channel;

recording in the memory channel the processed information units and the results of the execution of commands to the executive organs as well as results from internal processings, represented as information units.

2. An adaptive cognitive method, according to claim 1, which is also characterized with: searching information units, similar to the newly created, in the channel memory;

coping the values of the characteristics from the new unit in the found information unit and deleting the new information unit if an information unit is found in the memory channel, which has the same characteristics as the new information units;

creating an information unit for comparison purposes if a similar information unit is found in the memory channel, which has less, more or differing characteristics from the new information unit;

implementing the information units for comparison for finding the invariant characteristics of the information units from a given set and creating an information unit having only the found unchangeable (invariant) characteristics;

recording the new information unit in-the memory channel if it has not been deleted during the previous step.

3. An adaptive cognitive method, according to claim 1, which is also characterized with the search for information units, similar to the newly created, via the comparison of their characteristics and the creation of a new information unit as a result from that comparison, which has fields identifying the first and the second compared information units as well as lists "has" "none", "different" in which the results from the comparison of the characteristics of the examined information units will be recorded.

4. An adaptive cognitive method, according to claim 1, which is also characterized with the copying of the values of the characteristics of the new information unit in the found information unit only when the value of a given characteristic is not found in the list of values of the respective characteristic of the found information structure.

5. An adaptive cognitive method, according to claim 1, which is also characterized with the fact, that after the creation of an information unit having only unchangeable (invariant) characteristics, extracted from a given set of similar information units, the unchangeable characteristics from each information unit of that set are deleted and replaced by the created information unit which has only the unchangeable characteristics of the information units from the set.

6. An adaptive cognitive method, according to claim 1, which is also characterized with the fact, that the processing of the information units is executed according to their order of priority.

7. An adaptive cognitive method, according to claim 1, which is also characterized with the fact, that each information unit may be marked numerous times as belonging to various processes.

8. An adaptive cognitive method, according to claim 1, which is also characterized with the fact, that after the processing of a given information unit it is registered, if not already recorded in the list of subsequent information units of each information unit which has been active during a given period prior to the current time quantum.

9. An adaptive cognitive method, according to claim 1, which is also characterized with the fact, that of all registered possible subsequent information units, after a given information unit, a list is formed with the characteristics for filtering the input flow until fining the expected information unit.

10. An adaptive cognitive method, according to claim 1, which is also characterized with the fact, that a comparison is being made between a set of repeatedly and simultaneously appearing information units defining a new compound information unit which, on its part, has a time quantum and characteristics.

11. An adaptive cognitive method, according to claim 1, which is also characterized with the marking of each change in the system by time quantum, representing the number of shortest distinguishable time intervals which have passed as of the initial start of the system up to the current moment.

12. An adaptive cognitive method, according to claim 1, which is also characterized with the analysis of the correlation between the information units, registered in the system /which is before and which after and which is together with another information unit/, based on the time quantums of the information units of the changes in the values of their characteristics.

13. An adaptive cognitive method, according to claim 1, which is also characterized with the application of a counter of the uses of a given information unit during the making of a decision to use or delete a given information unit.

14. An adaptive cognitive method, according to claim 1, which is also characterized with the interpretation of the commands from the command channels of the system as input information units and searching for a correlation between them and the remaining information units, registered in the system.

15. An adaptive cognitive method, according to claim 1, which is also characterized with the achievement of a target, represented by a set of expected information units at the input channels via the searching and execution of a group of commands associated with a previous achievement of the target, or searching for a connection "cause and effect" with the help of the time quantums of the information units which appear at closer moments in time;

finding information units necessary for the appearance of the target information unit;

formulating sub-targets, which in their target set of information units contain the necessary information units found during the previous step;

generating commands;

assessing the optimality of the generated commands according to the proximity during the comparison of the information units at the input to the set of information units in the information unit-target in the meta command channel.

16. A system which includes sensors and executive organs with input channels for the data from the sensors, command channels for data (commands) to the executive organs of the system as well as a meta command channel for the placing of targets, including a memory channel for recording data on the status of the system and which executes an adaptive cognitive method according to claim 1.

17. A system according to claim 16, characterized also with the fact, that the executive organs permit it to connect to the Internet and to use its contents as an input channel as well as to publish contents in the Internet or to offer services in this environment.

18. A system according to claim 16 characterized also with the fact, that the executive organs of the system are robot devices while the input channels of the system receive data from the robot's sensor channels.

* * * * *